(12) United States Patent
Lee et al.

(10) Patent No.: US 12,301,476 B2
(45) Date of Patent: May 13, 2025

(54) RESOURCE CONSUMPTION CONTROL

(71) Applicant: Intel Corporation, Santa Clara, CA (US)

(72) Inventors: Junggun Lee, Los Altos, CA (US); Rong Pan, Saratoga, CA (US); Robert Southworth, Chatsworth, CA (US); Gary Muntz, Lexington, MA (US); Changhoon Kim, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 17/482,822

(22) Filed: Sep. 23, 2021

(65) Prior Publication Data

US 2022/0014478 A1 Jan. 13, 2022

Related U.S. Application Data

(60) Provisional application No. 63/130,667, filed on Dec. 26, 2020.

(51) Int. Cl.
*H04L 47/70* (2022.01)
*H04L 43/067* (2022.01)
(Continued)

(52) U.S. Cl.
CPC .......... *H04L 47/827* (2013.01); *H04L 43/067* (2013.01); *H04L 47/762* (2013.01); *H04L 47/781* (2013.01)

(58) Field of Classification Search
CPC ..... H04L 43/067; H04L 47/827; H04L 47/62; H04L 47/781
See application file for complete search history.

(56) References Cited

U.S. PATENT DOCUMENTS 6,175,554 B1 1/2001 Jang et al.
6,505,253 B1 1/2003 Chiu et al.
(Continued)

FOREIGN PATENT DOCUMENTS

CN 101005460 A 7/2007
CN 101414957 A 12/2010
(Continued)

OTHER PUBLICATIONS

Pan et al., "INT-path: Towards Otimalo Path Planning for In-band Network-Wide Telemetry", Infocom 2019, IEEE Conference on Computer Communications, Apr. 29, 2019.*

(Continued)

*Primary Examiner* — Todd L Barker
(74) *Attorney, Agent, or Firm* — Compass IP Law PC

(57) ABSTRACT

Examples described herein relate to a network interface device comprising dataplane circuitry, when operational, is to generate a representation of aggregated network resource consumption information based on network resource consumption at the network interface device or at least one other network device and to transmit at least one packet with a multi-bit representation of the aggregated network resource consumption information to a second network interface device. In some examples, the network resource consumption information comprises one or more of: available transmit bandwidth, transmit bandwidth used by a queue or flow, queue depth, measured queueing time duration, expected queueing time duration, packet latency, or normalized in-flight bytes.

19 Claims, 8 Drawing Sheets

(51) Int. Cl.
  *H04L 47/762* (2022.01)
  *H04L 47/78* (2022.01)

(56) References Cited

U.S. PATENT DOCUMENTS

| | | | |
|---|---|---|---|
| 7,369,498 | B1 | 5/2008 | Ma et al. |
| 7,386,721 | B1* | 6/2008 | Vilhuber ............ H04L 63/0823 |
| | | | 713/153 |
| 7,730,201 | B1 | 6/2010 | McAllister et al. |
| 7,738,376 | B2 | 6/2010 | Balakrishnan et al. |
| 8,077,606 | B1 | 12/2011 | Litwack |
| 8,204,069 | B2 | 6/2012 | Jones et al. |
| 9,172,643 | B2 | 10/2015 | Harrang et al. |
| 9,210,063 | B2 | 12/2015 | Ishikawa |
| 9,270,598 | B1 | 2/2016 | Oran et al. |
| 9,444,741 | B2 | 9/2016 | Agarwal et al. |
| 10,148,746 | B2 | 12/2018 | Itkin et al. |
| 10,606,604 | B2 | 3/2020 | Sharma et al. |
| 10,673,816 | B1* | 6/2020 | Robertson ........... H04L 63/1416 |
| 11,057,294 | B2 | 7/2021 | Inoue et al. |
| 11,088,966 | B2 | 8/2021 | Menachem et al. |
| 11,153,211 | B2 | 10/2021 | Ravi et al. |
| 2002/0041328 | A1 | 4/2002 | LeCompte et al. |
| 2002/0099854 | A1 | 7/2002 | Jorgensen |
| 2002/0176361 | A1 | 11/2002 | Wu et al. |
| 2003/0035373 | A1* | 2/2003 | Bass ....................... H04L 47/10 |
| | | | 370/230.1 |
| 2003/0076781 | A1 | 4/2003 | Enomoto et al. |
| 2003/0210651 | A1 | 11/2003 | Tzeng et al. |
| 2005/0157750 | A1 | 7/2005 | Rabie et al. |
| 2006/0015639 | A1 | 1/2006 | Taylor |
| 2006/0018329 | A1 | 1/2006 | Nielsen et al. |
| 2006/0026279 | A1 | 2/2006 | Zigmond et al. |
| 2006/0056308 | A1 | 3/2006 | Gusat et al. |
| 2006/0092836 | A1 | 5/2006 | Kwan et al. |
| 2006/0159016 | A1 | 7/2006 | Sagfors et al. |
| 2006/0203730 | A1 | 9/2006 | Zur |
| 2006/0215550 | A1 | 9/2006 | Malhotra |
| 2007/0058532 | A1 | 3/2007 | Wadekar et al. |
| 2007/0076604 | A1 | 4/2007 | Litwack |
| 2007/0127381 | A1 | 6/2007 | Oh et al. |
| 2008/0186989 | A1 | 8/2008 | Kim |
| 2008/0259798 | A1 | 10/2008 | Loh et al. |
| 2009/0238068 | A1 | 9/2009 | DeCusatis et al. |
| 2010/0039937 | A1 | 2/2010 | Ramanujan et al. |
| 2010/0100822 | A1* | 4/2010 | Aaron ..................... H04L 12/66 |
| | | | 709/204 |
| 2010/0214943 | A1 | 8/2010 | Immendorf et al. |
| 2010/0246583 | A1 | 9/2010 | Morinaga et al. |
| 2010/0254262 | A1 | 10/2010 | Kantawala et al. |
| 2011/0016209 | A1* | 1/2011 | Moncaster ............... H04L 47/31 |
| | | | 709/224 |
| 2011/0019549 | A1 | 1/2011 | Strulo et al. |
| 2011/0044169 | A1 | 2/2011 | Liu |
| 2011/0069616 | A1 | 3/2011 | Revels |
| 2011/0170410 | A1 | 7/2011 | Zhao et al. |
| 2011/0202926 | A1 | 8/2011 | Chambliss |
| 2011/0205895 | A1 | 8/2011 | Chen et al. |
| 2011/0255410 | A1 | 10/2011 | Yamen et al. |
| 2012/0008502 | A1 | 1/2012 | Kadambi et al. |
| 2012/0155262 | A1 | 6/2012 | Li et al. |
| 2012/0320779 | A1 | 12/2012 | Smith et al. |
| 2013/0182568 | A1 | 7/2013 | Lee et al. |
| 2013/0185454 | A1 | 7/2013 | Guillemin et al. |
| 2013/0246650 | A1 | 9/2013 | Tsuboki et al. |
| 2014/0071831 | A1 | 3/2014 | Sinha et al. |
| 2014/0192646 | A1 | 7/2014 | Mir et al. |
| 2014/0233382 | A1 | 8/2014 | Matthews et al. |
| 2014/0233390 | A1 | 8/2014 | Schmid et al. |
| 2014/0254357 | A1 | 9/2014 | Agarwal et al. |
| 2014/0269271 | A1 | 9/2014 | Gafni et al. |
| 2015/0071072 | A1 | 3/2015 | Ratzin et al. |
| 2015/0156082 | A1 | 6/2015 | Kakadia et al. |
| 2015/0163117 | A1 | 6/2015 | Lambeth et al. |
| 2015/0180924 | A1 | 6/2015 | O'Callaghan |
| 2015/0195150 | A1 | 7/2015 | Ritter et al. |
| 2015/0195209 | A1 | 7/2015 | Bottorff et al. |
| 2015/0222550 | A1 | 8/2015 | Anand |
| 2015/0236957 | A1 | 8/2015 | Albanese et al. |
| 2015/0271081 | A1 | 9/2015 | Arumilli et al. |
| 2015/0295856 | A1 | 10/2015 | Karthikeyan et al. |
| 2015/0350097 | A1 | 12/2015 | Osuga |
| 2016/0014029 | A1 | 1/2016 | Yuan et al. |
| 2016/0050653 | A1 | 2/2016 | Rastogi |
| 2016/0057040 | A1 | 2/2016 | Bergeron |
| 2016/0113025 | A1 | 4/2016 | Shaw et al. |
| 2016/0183374 | A1 | 6/2016 | Prakash et al. |
| 2016/0308769 | A1 | 10/2016 | Versteeg et al. |
| 2017/0109298 | A1 | 4/2017 | Kurita et al. |
| 2017/0339062 | A1 | 11/2017 | Mayer-Wolf et al. |
| 2018/0013677 | A1 | 1/2018 | Tang et al. |
| 2018/0184326 | A1 | 6/2018 | Ben-Haim et al. |
| 2018/0198715 | A1 | 7/2018 | Shmilovici et al. |
| 2018/0316613 | A1 | 11/2018 | Gafni et al. |
| 2018/0343206 | A1 | 11/2018 | White et al. |
| 2019/0075486 | A1 | 3/2019 | Welin et al. |
| 2019/0089644 | A1 | 3/2019 | Shpiner et al. |
| 2019/0280978 | A1 | 9/2019 | Schmatz et al. |
| 2019/0280982 | A1 | 9/2019 | Shiraki |
| 2019/0386924 | A1 | 12/2019 | Srinivasan et al. |
| 2020/0053745 | A1* | 2/2020 | Luo ..................... H04W 72/121 |
| 2020/0084155 | A1 | 3/2020 | Song et al. |
| 2020/0145349 | A1 | 5/2020 | Menachem et al. |
| 2020/0280518 | A1 | 9/2020 | Lee et al. |
| 2020/0351756 | A1 | 11/2020 | Jager et al. |
| 2021/0051102 | A1 | 2/2021 | Dong et al. |
| 2021/0152474 | A1 | 5/2021 | Shpigelman et al. |
| 2021/0320866 | A1 | 10/2021 | Le et al. |
| 2021/0328930 | A1 | 10/2021 | Nikolaidis et al. |
| 2022/0279055 | A1 | 9/2022 | Bosshart |

FOREIGN PATENT DOCUMENTS

| | | |
|---|---|---|
| EP | 1805524 B1 | 5/2013 |
| EP | 3461082 A1 | 3/2019 |
| EP | 2615802 B1 | 4/2019 |
| JP | H06209330 A1 | 5/1995 |
| KR | 20120105321 A | 9/2012 |
| WO | 2016000842 A1 | 1/2016 |
| WO | 2017146620 A1 | 8/2017 |

OTHER PUBLICATIONS

Kim et al., "In-band Network Telemetry via Programmable Dataplanes", ACM SIGCOMM Symposium on SDN Research, 2015.*

Li et al. "HPCC: High Precision Congestion Control" SIGCOMM 2019, Proceedings of the ACM Special interest Group on Data Communication, Aug. 2019, pp. 44-58.*

"In-band Network Telemetry (INT) Dataplane Specification", Version 2.0, The P4.org Applications Working Group, https://github.com/p4lang/p4-applications/blob/master/docs/INT_v2_0.pdf, Feb. 14, 2020, 66 pages.

Advisory Action for U.S. Appl. No. 16/517,358, Mailed Jul. 20, 2022, 3 pages.

Alizadeh, Mohammad, et al., "Data Center TCP (DCTCP)", https://web.stanford.edu/class/ee384m/Handouts/handout16.pdf, May 14, 2011, 25 pages.

Asaf Samuel et al., "Routing Keys", 2017 IEEE 25th Annual Symposium on High-Performance Interconnects (HOTI), Aug. 2017, 8 pages.

Baker, F., "Requirements for IP Version 4 Routers", Network Working Group, https://datatracker.ietf.org/doc/html/rfc1812, Jun. 1995, 350 pages.

Braden, R., "Requirements for Internet Hosts—Communication Layers", Network Working Group, https://datatracker.ietf.org/doc/html/rfc1122, Oct. 1989, 232 pages.

Brockners, F., et al., "Data Fields for In-situ OAM", https://datatracker.ietf.org/doc/html/draft-ietf-ippm-ioam-data-09, Mar. 8, 2020, 86 pages.

Cisco, "Hierarchical Queuing Framework", White Paper, 2008 Cisco Systems, Inc., Jul. 2008, 9 pages.

(56) References Cited

OTHER PUBLICATIONS

Davide Bergamasco, "Data Center Ethernet Congestion Management: Backward Congestion Notification", Cisco Systems, Inc., IEEE 802.1 Interim Meeting, Berlin, Germany, May 12, 2005, 25 pages.
Extended European Search Report for Patent Application No. 20164676.7, Mailed Nov. 4, 2020, 10 pages.
Fei Chen et al., "Data Center Congestion Management requirements", Huawei Technologies Co. Ltd., Jul. 2019, 9 pages.
Feldmann, Anja, et al., "P4-enabled Network-assisted Congestion Feedback: A Case for NACKs", © 2019 Association for Computing Machinery, http://buffer-workshop.stanford.edu/papers/paper6.pdf, BS'19, December 2-3, Stanford, CA, 7 pages.
Final Office Action for U.S. Appl. No. 16/517,358, Mailed Mar. 15, 2022, 25 pages.
First Office Action for U.S. Appl. No. 16/517,358, Mailed Sep. 17, 2020, 18 pages.
Gont, F., "Deprecation of ICMP Source Quench Messages", Internet Engineering Task Force (IETF), May 2012, 16 pages.
Postel, J., "Internet Control Message Protocol Darpa Internet Program Protocol Specification", Network Working Group, https://datatracker.ietf.org/doc/html/rfc792, Sep. 1981, 42 pages.
Second Office Action for U.S. Appl. No. 16/517,358, Mailed Jun. 1, 2021, 21 pages.
Techlibrary, "Data Center Quantized Congestion Notification (DCQCN)", Juniper Networks, Inc., Oct. 4, 2018, 8 pages.
Third Office Action for U.S. Appl. No. 16/517,358, Mailed Oct. 28, 2021, 22 pages.
Transition Networks, The Conversion Technology Experts, "Quality of Service (QoS) in High-Priority Applications", www.transition.com/.../uploads/2016/05/qos_wp.pdf, 2016, 12 pages.
U.S. Appl. No. 15/835,238, filed Dec. 7, 2017, 69 pages.
U.S. Appl. No. 15/835,239, filed Dec. 7, 2017, 69 pages.
U.S. Appl. No. 15/835,242, filed Dec. 7, 2017, 69 pages.
U.S. Appl. No. 15/835,249, filed Dec. 7, 2017, 69 pages.
William Stallings, "Quality of Service (QoS) for Local Area Networks (LANs)", informIT, Prentice Hall, Feb. 15, 2002, 4 pages.
First Office Action for U.S. Appl. No. 17/359,533, Mailed Nov. 29, 2023, 28 pages.
"Media Access Control (MAC) Bridges and Virtual Bridged Local Area Networks—Amendment 17: Priority-based Flow Control", IEEE Standard for Local and metropolitan area networks—IEEE Computer Society, Sep. 30, 2011, 40 pages.
"WRED (Weighted Random Early Detection)", Cisco NetworkLessons.com, https://networklessons.com/cisco/ccie-routing-switching-written/wred-weighted-random-early-detection, © 2013—2022 NetworkLessons.com, 4 pages.
Barak, Dotan, "RDMAmojo ibv_modify_qp()", https://www.rdmamojo.com/2013/01/12/ibv_modify_qp/, Jan. 12, 2013, 15 pages.
Floyd, Sally, et al., "Random Early Detection Gateways for Congestion Avoidance", To appear in the Aug. 1993 IEEE/ACM Transactions on Networking, 32 pages.
First Office Action for U.S. Appl. No. 16/878,466, Mailed Mar. 1, 2023, 17 pages.
Second Office Action for U.S. Appl. No. 16/878,466, Mailed Nov. 3, 2023, 19 pages.
Final Office Action for U.S. Appl. No. 16/878,466, Mailed Jun. 20, 2023, 17 pages.
"In-band Network Telemetry (INT) Dataplane Specification", Version 2.0, The P4.org Applications Working Group, https://github.com/p4lang/p4-applications/blob/master/docs/INT_v2_0.pdf, Feb. 14, 2020, 36 pages.
Brockners, Frank et al., "Data Fields for In-situ OAM", https://tools.ietf.org/html/draft-ietf-ippm-ioam-data-09, Mar. 8, 2020, 43 pages.
Fairhurst, Gorry and Welzl, Michael, RFC: 8087, "The Benefits of Using Explicit Congestion Notification (ECN)", https://datatracker.ietf.org/doc/html/rfc8087, Mar. 2017, 19 pages.
Intel White Paper, "In-band Network Telemetry Detects Network Performance Issues", Dec. 2020, 5 pages.
Kumar, Jai et al., "Inband Flow Analyzer", https://tools.ietf.org/html/draft-kumar-ippm-ifa-02, Apr. 24, 2020, 35 pages.
International Search Report and Written Opinion for PCT Patent Application No. PCT/US21/52106, Mailed Jan. 17, 2022, 11 pages.
International Search Report and Written Opinion for PCT Patent Application No. PCT/US22/42382, Mailed Dec. 22, 2022, 11 pages.
Second Final Office Action for U.S. Appl. No. 16/878,466, Mailed Apr. 5, 2024, 20 pages.
Advisory Action for U.S. Appl. No. 16/878,466, Mailed Jul. 25, 2024, 4 pages.
Final Office Action for U.S. Appl. No. 17/359,533, Mailed May 10, 2024, 66 pages.
First Office Action for U.S. Appl. No. 17/667,415, Mailed Sep. 11, 2024, 15 pages.
Advisory Action for U.S. Appl. No. 17/359,533, Mailed Aug. 30, 2024, 3 pages.
Salim, Jamal Hadi and Ahmed, Uvaiz, "Performance Evaluation of Explicit Congestion Notification (ECN) in IP Networks", RFC: 2884, Jul. 2000, 18 pages.
Notice of Allowance for U.S. Appl. No. 16/878,466, Mailed Dec. 11, 2024, 12 pages.
First Office Action for U.S. Appl. No. 17/839,393, Mailed Nov. 21, 2024, 21 pages.
Kadhum et al., "Fast Congestion In Notification Mechanism for ECN-Capable Routers", International Symposium on Information Technology, 2008 IEEE, Aug. 26, 2008, 6 pages.
Yan et al, "ACC: Automatic ECN Tuning for High-Speed Datacenter Networks", Proceedings of the 201 ACM Sigcomm 2021 Conference, Aug. 9, 2021, pp. 384-397, 14 pages.
Hollot, C. V., et al., "On Designing Improved Controllers for AQM Routers Supporting TCP Flows", Proceedings IEEE INFOCOM 2001, Conference on Computer Communications, Twentieth Annual Joint Conference of the IEEE Computer and Communications Society (Cat. No. 01CH37213), Apr. 22-26, 2001, 9 pages.
Huawei, "CloudEngine Is the Foundation of the Intent-driven Network", Huawei CloudEngine Series Switches Technical Presentation, Copyright© 2018 Huawei Technologies Co., Ltd., 28 pages.
International Search Report and Written Opinion for PCT Patent Application No. PCT/US22/22042, Mailed Jul. 18, 2022, 10 pages.
James McCauley et al., "Thoughts on Load Distribution and the Role of Programmable Switches", ACM SIGCOMM Computer Communication Review, vol. 49 Issue 1, Jan. 2019, 6 pages.
K. Ramakrishnan et al., "The Addition of Explicit Congestion Notification (ECN) to IP", TeraOptic Networks, EMC, Sep. 2001, 64 pages.
Kumar, J., et al., "Inband Flow Analyzer", https://datatracker.ietf.org/doc/html/draft-kumar-ippm-ifa-01, Feb. 21, 2019, 74 pages.
Lee, Jeongkeun, "Advanced Congestion & Flow Control with Programmable Switches", Expert Roundtable Series hosted by ONF, Apr. 28-29, 2020, 10 pages.
Li, Yuliang, et al., "HPCC: High Precision Congestion Control", SIGCOMM '19, Aug. 19-23, 2019, Beijing, China, © 2019 Association for Computing Machinery, 15 pages.
Maor, Ophir, "RoCEv2 CNP Packet Format Example", Mellanox, https://support.mellanox.com/s/article/rocev2-cnp-packet-format-example, published Dec. 5, 2018, 3 pages.
Mohammad Alizadeh et al., "Data Center Transport Mechanisms: Congestion Control Theory and IEEE Standardization", 46th Annual Allerton Conference, Illinois, USA, Sep. 2008, 8 pages.
Pan, Rong, et al., "PIE: A Lightweight Control Scheme to Address the Bufferbloat Problem", 2013 IEEE 14th International Conference on High Performance Switching and Routing (HPSR), Jul. 8-11, 2013, 8 pages.

\* cited by examiner

Algorithm 1 Sender algorithm. $ack.L$ is an array of link feedbacks in the ACK; each link $ack.L[i]$ has four fields: $qlen, txBytes, ts,$ and $B$. $L$ is the sender's record of link feedbacks at the last update.

1: function MEASUREINFLIGHT($ack$)
2:     $u = 0$;
3:     for each link $i$ on the path do
4:        $txRate = \frac{ack.L[i].txBytes - L[i].txBytes}{ack.L[i].ts - L[i].ts}$;
5:        $u' = \frac{\max(ack.L[i].qlen, L[i].qlen)}{ack.L[i].B \cdot T} + \frac{txRate}{ack.L[i].B}$;
6:        if $u' > u$ then
7:           $u = u'; \tau = ack.L[i].ts - L[i].ts$;
8:     $\tau = \min(\tau, T)$;
9:     $U = (1 - \frac{\tau}{T}) \cdot U + \frac{\tau}{T} \cdot u$;
10:    return $U$;
11: function COMPUTEWIND($U$, $updateWc$)
12:    if $U > = \eta$ or $incStage > = maxStage$ then
13:       $W = \frac{W^c}{U/\eta} + W_{AI}$;
14:       if $updateWc$ then
15:          $incStage = 0; W^c = W$;
16:    else
17:       $W = W^c + W_{AI}$;
18:       if $updateWc$ then
19:          $incStage + +; W^c = W$;
20:    return $W$;
21: procedure NEWACK($ack$)
22:    if $ack.seq > lastUpdateSeq$ then
23:       $W = $ COMPUTEWIND(MEASUREINFLIGHT($ack$), $True$);
24:       $lastUpdateSeq = snd\_nxt$;
25:    else
26:       $W = $ COMPUTEWIND(MEASUREINFLIGHT($ack$), $False$);
27:    $R = \frac{W}{T}, L = ack.L$;

FIG. 2

RESOURCE CONSUMPTION CONTROL

RELATED APPLICATION

The present application claims the benefit of priority of U.S. Provisional application 63/130,667, filed Dec. 26, 2020. The contents of that application is incorporated in its entirety herein.

DESCRIPTION

Datacenter networks can deliver high packet throughput with low latency and network stability in order to meet the requirements of state-of-the-art applications. Congestion control plays a key role in achieving these stringent performance demands. High Precision Congestion Control (HPCC) is a congestion control system. HPCC is described at least in Li et al., "HPCC: High Precision Congestion Control" SIGCOMM (2019). HPCC leverages in-network telemetry (INT) to obtain precise link load information and controls traffic precisely. By addressing challenges such as delayed INT information during congestion and overreaction to INT information, HPCC can quickly converge to utilize free bandwidth while avoiding congestion and can maintain near-zero in-network queues for ultra-low latency.

FIG. 1 depicts an example of a system. Sender 100 sends a packet (pkt) to first switch 102. First switch 102 can insert an in-band network telemetry (INT) or in-network telemetry information related to first switch 102 into packet header(s) of the packet. First switch 102 sends the packet with INT information inserted by first 102 switch to second switch 104. Second switch 104 inserts its own in-band network telemetry (INT) information or in-network telemetry to the packet header(s) of the packet. Second switch 104 sends the packet with inserted INT information of first switch 102 and second switch 104 to receiver 106. More than two switches or other network elements (e.g., network interface configured to operate as a forward element) can be used.

Receiver 106 receives the packet with the inserted INT information. Receiver 106 echoes (e.g., sends a copy) INT information to sender 100 in an acknowledge (ACK) packet. An ACK packet can include echoed INT information and packet acknowledgement (packet-ack) acknowledging that the packet was received by receiver 106 and the packet is not in flight anymore. Sender 100 can adjust packet transmit rate based on the accumulated INT information in ACKs considering the worst case scenario such as worst congestion level present and experienced through first switch 102 and second switch 104 (or other switches or devices along a path from sender 100 to receiver 106). A worst congestion level present and experienced through first switch 102 and second switch 104 (or other switches or devices along a path from sender 100 to receiver 106) can be a highest level of transit delay of any switch in the path, highest level of queue depth of any switch in the path, highest level of buffer occupancy of any switch in the path.

However, collecting a set of metadata from multiple hop switches can incur overhead in data packets, such as when the in-band telemetry scheme used in the switches is fixed (e.g., Internet Engineering Task Force (IETF) draft-kumar-ippm-ifa-01, "Inband Flow Analyzer" (February 2019)) and can carry data that is not utilized. Even when a congestion scheme provides a flexible amount of congestion-related data, the per-packet overhead can grow as the network scales or increases in size. In other words, the more hops a packet traverses, the larger the header overhead.

Instead of embedding INT information into data packets, some solutions transmit separate probe packets to collect the congestion metadata to keep a total size of an original data packet plus added INT header from exceeding the max size allowed by the fabric. The probe packets can incur additional packet processing overhead at network interface controllers (NICs), routers, and switches. Due to the additional overhead Packets per Second (PPS), users have to limit the probe packet frequency, hence delaying the detection and reaction to congestion events.

BRIEF DESCRIPTION OF THE DRAWINGS

FIG. 2 depicts an algorithm from HPCC.

DETAILED DESCRIPTION

Figure 1:
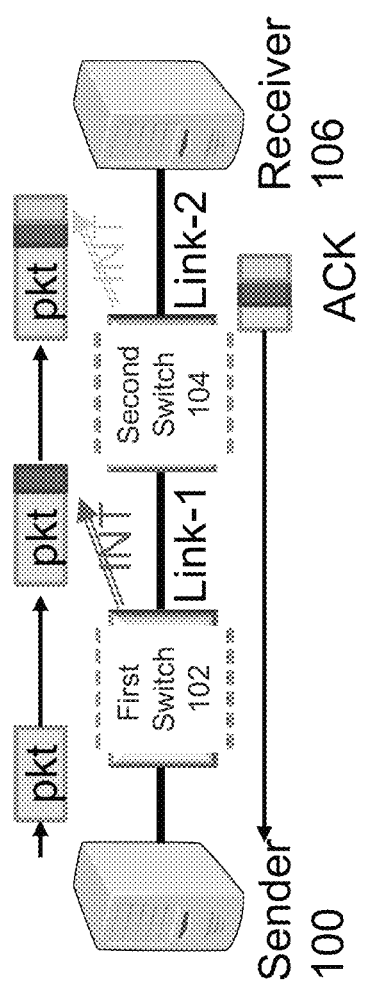
FIG. 1 depicts an example of a system with congestion feedback.

Some examples offload the computation of resource consumption metrics and processing resource consumption metrics to a network interface device. In some examples, a fixed-function or programmable data plane of a network interface device can compute resource consumption metrics at the network interface device and scale the resource consumption metrics. The programmable data plane can process received resource consumption metrics from another device and determine whether to send, to a next node, received resource consumption metrics from one or more other devices or resource consumption metrics of the network interface device. Received resource consumption metrics from one or more other devices can represent a highest and one or more next highest resource consumption metrics identified for a path, such a highest level of transit delay of a switch in the path, highest level of queue depth of any switch in the path, highest level of buffer occupancy of a switch in the path, as well as one or more next highest levels.

The programmable data plane can cause transmission, to a next node, of resource consumption metrics that represent a highest resource consumption metrics identified for a path by choosing a higher of the received resource consumption metrics from another device or resource consumption metrics measured at the network interface device. In some examples, the resource consumption metrics can represent a combined representation of queue length and transmit bandwidth. In some examples, the resource consumption metrics can represent one or more of: queue utilization of a particular queue, dequeue rate of a particular queue, transmit bandwidth, HPCC U value, and so forth. In some examples, as the worst identified congestion at the network interface device and other network interface devices in a path are identified, the worst identified resource consumption metrics can be sent to a next network interface device in the path. However, resource consumption metrics for more than one network interface device can be transmitted to the next network interface device in the path, such as worst identified resource consumption metrics and one or more next worst identified resource consumption metrics. Accordingly, a number of bits used to convey resource consumption metrics can be limited if limited sets of resource consumption metrics are sent to a next network interface device.

When the data sender receives the resource consumption metrics, it can utilize the information to perform a variety of actions include pausing transmission to a congested device, reducing transmission rate of packets to the network interface device identified with the worst congestion, transmitting packets on an alternate path to avoid a congested network interface device, FIG. 2 depicts an example of HPCC sender process reproduced from described in Li et al., "HPCC: High Precision Congestion Control" SIGCOMM (2019). For a node in a path, function MeasureInflight(ack) can determine a value U representing inflight_bytes per-link or port such as [bytes sent but for which acknowledgement (ACK) has not been received divided by bandwidth delay product (BDP) number of bytes]. Normalization can be applied to the value U to allow comparison of resource consumption metrics among different switch hop nodes with different link speeds in a fair manner as BDP can be different on each hop. MeasureInflight(ack) can generate a decimal value between 0 and 1 if there is no congestion or MeasureInflight(ack) can be larger than 1 in the presence of congestion.

Some examples offload determination of one or more resource consumption metrics (e.g., MeasureInflight(ack) or other resource consumption metric determination technologies) to a network interface device, such as a fixed-function or programmable dataplane of the network interface device. In some examples, instead of performing arithmetic using fixed point or floating point decimal numbers, a value of inflight_bytes can be normalized by a normalization value (sFactor) to generate an integer number. Inflight_bytes can be an indicator of number of bytes that are transmitted in packets but acknowledgement of receipt of the packets was not sent or received by a sender. Integer arithmetic can be performed faster in some cases than arithmetic involving decimals. Integer arithmetic can be performed on the integer inflight_bytes of inflight_bytes value to determine resource consumption metrics or determine a most congested node, such as summation (e.g., to determine path latency based on at least one other latency value), multiplication, division, and comparison of two values. Some examples of a network interface device can perform a max operation on resource consumption metrics and send the detected worst resource consumption metrics in a path to a next network interface device. The congestion information can be propagated via one or more node hops to an endpoint sender node. Various examples can use Data Center Bridging (DCB) for bandwidth allocation, priority determination, and flow control of multiple traffic types when sharing the same network link.

Figure 3:
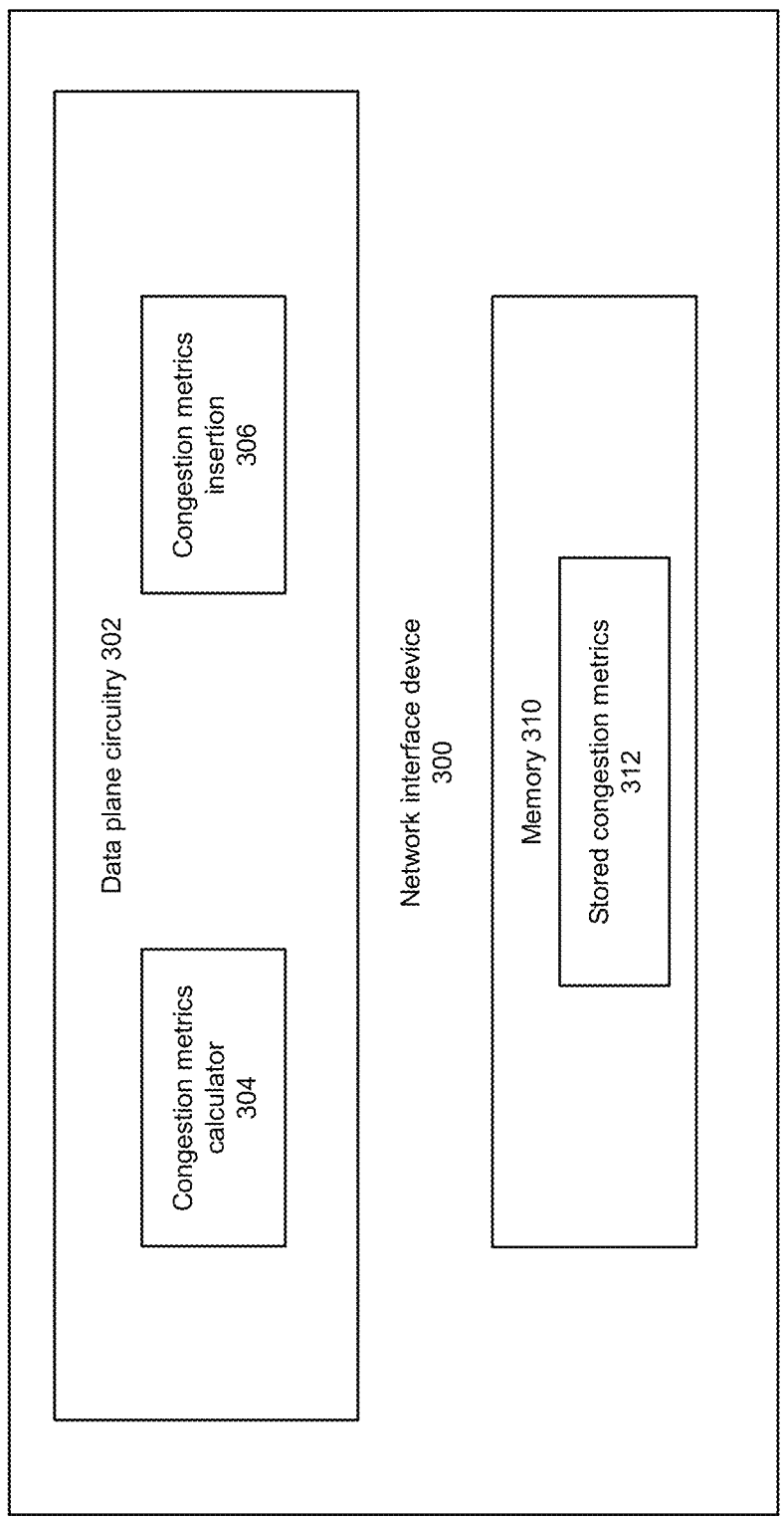
FIG. 3 depicts an example of a network interface device.

FIG. 3 depicts an example of a network interface device. Network interface device 300 can be implemented as one or more of: a network interface controller (NIC) (e.g., endpoint receiver NIC or NIC in a path from sender to receiver), a remote direct memory access (RDMA)-enabled NIC, SmartNIC, router, switch, forwarding element, infrastructure processing unit (IPU), data processing unit (DPU).

Packet processing pipeline 302 can be fixed function or programmable and configured to perform match-action operations on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. As described herein, packet processing pipelines 302 can be configured to determine resource consumption metrics to include in a packet prior to packet egress. Packet processing pipelines 302 can generate resource consumption metrics for network interface device 300 and compare such resource consumption metrics against resource consumption metrics received from another network interface device to determine which resource consumption metrics to include in a packet that is to be egressed. Configuration of operation of packet processing pipelines 302, including its data plane, can be programmed using P4, C, Python, Broadcom Network Programming Language (NPL), or x86 compatible executable binaries or other executable binaries.

Resource consumption metrics can be stored in memory 310 as stored resource consumption metrics 312. Stored resource consumption metrics 312 can include resource consumption metrics measured for network interface device 300 and/or resource consumption metrics received in one or more packets from another network interface device. In some examples, the worst or highest congestion information received at network interface device 300 as well as one or more of the next worst or highest congestion information received at network interface device 300 can be stored at network interface device 300. For example, resource consumption metrics can include one or more of: depth of the queue that a received packet (e.g., number of bytes in the queue), that carried congestion information from another node, is enqueued within as well as enqueue time at which queue depth is measured and/or dequeue time at which queue depth is measured; measured queueing time experienced by a received packet such as time the received packet is enqueued in a queue; expected queueing time of the packet in the tail of the queue, which can be derived from the current dequeue time queue depth and the draining rate of the queue where the draining rate can vary based on multi-queue prioritization and interactions between them; drain rate or transmit rate of packets from the queue; drain rate or transmit rate of packets from a port from which the packet egressed; available bandwidth of the port from which the packet egressed (e.g., line rate minus port transmit rate); bandwidth capability of port hardware; and/or normalized inflight_bytes (variable U described herein).

Resource consumption metrics can include associated locator metadata to locate a device or port associated with a resource consumption metric including one or more of: node identifier (nodeID), egress port identifier (eportID), queue identifier (qID), time to live (TTL) at a worst congested node (and potentially one or more next worst congested nodes) to determine hop distance, and/or hash of above locator fields to help a receiver to store and access information for a key-value.

In some examples, resource consumption metrics calculator 304 can determine MeasureInflight(ack) experienced by network interface device 300 as described in HPCC Algorithm 1 by computing inflight_bytes and normalizing inflight_bytes as well as scaling normalized inflight_bytes by sFactor to an integer value. Congestion state can be stored in integer form in stored resource consumption metrics 312. Resource consumption metrics calculator 304 can determine a resource consumption metric as an aggregate of queue length and available transmit bandwidth or determine aggregate of queue length and available transmit bandwidth separately and provide separate queue length and available transmit bandwidth.

In some examples, when network interface device 300 utilizes Algorithm 1 of HPCC, a call to MeasureInflight(ack) can be replaced by pkt.U to generate U, a representation of queue utilization of a particular queue. In some examples, resource consumption metrics calculator 304 can compute U as follows in order to combine a representation of queue length and transmit bandwidth:

$U = qlen*a + txRate*b$, where glen can represent a queue length (e.g., number of bytes in a queue that stores received packets (with and without resource consumption metrics) that are going to a same next hop), txRate can represent a transmit rate from a port, a and b are configurable parameters from a control plane, where a can represent (cell_size*sFactor)/(B*T), cell_size can represent the size of cells used in the queueing system to store packet data in the packet buffer and a cell can indicate a number of bytes (e.g., 64 Bytes), B can represent link bandwidth, per switch and port, T can represent congestion-free round trip time (RTT) for a longest hop distance in the network, network-wide global parameter.

$b = sFactor/B$, sFactor can represent a scale factor that is used to normalize inflight_bytes as an integer.

sFactor can control resolution of link utilization and can be consistent across the switches and network devices in a path in which congestion metrics are measured and propagated. In some examples, sFactor=$2^3$ and an integer 8 can used to represent a case when queue length (qlen)=0 and link_util=100%. An integer value 16 can represent a case where qlen=Bandwidth Delay Product (BxT) and link_util=100%.

Resource consumption metrics calculator 304 operation can be performed by data plane circuitry 302 and can determine resource consumption metrics to include in a packet that is to be egressed based on one or more of the following arithmetic operations: maximum, minimum, summation, count, or average. For example, resource consumption metrics calculator 304 can select for egress a maximum of U value (e.g., normalized inflight_bytes) computed for network interface device 300 and a U value received in a packet to include as resource consumption metrics to be included in an egressed packet to be transmitted to another network interface device (e.g., next hop network interface device). For example, resource consumption metrics calculator 304 can select for egress in a packet a maximum of queue depth (e.g., enqueue or dequeue time) computed for network interface device 300 and that received in a packet. For example, resource consumption metrics calculator 304 can select for egress in a packet a maximum of queue time (measured or expected) computed for network interface device 300 and that received in a packet.

For example, resource consumption metrics calculator 304 can calculate a summation of queueing time received in a packet with a queueing time for a packet in a queue. In other words, congestion information conveyed in a packet header can be added to the queueing time experienced in the current node. For example, resource consumption metrics calculator 304 can select for egress in a packet a minimum of transmit rate from a queue or port computed for network interface device 300 and that received in a packet to determine a congested link between nodes as a lowest transmit rate link can represent a bottleneck. For example, resource consumption metrics calculator 304 can select for egress in a packet a minimum of available bandwidth (e.g., line_rate—transmit rate) from a queue or port computed for network interface device 300 and that received in a packet to determine a congested link between nodes.

In some examples, resource consumption metrics calculator 304 can perform the following pseudocode to select resource consumption metrics to include in a packet to be sent to a next hop such as whether to permit a packet having resource consumption metrics in its header to continue to convey the same resource consumption metrics or to update resource consumption metrics in the header with resource consumption metrics determined for network interface device 300.

```
PSEUDOCODE:
   A packet's resource consumption metrics (pkt.X) can be updated with the network
   interface device resource consumption metrics (sw.X) as follows:
      If sw.CM > pkt.CM, then:
         pkt. CM = sw. CM
         pkt.nodeID = sw.nodeID
         ... # update all locator IDs
      else: do not modify CM value
```

In some examples, resource consumption metrics insertion 306 operation performed by data plane circuitry 302 can include the resource consumption metrics determined by resource consumption metrics calculator 304 in one or more packets for egress to a next hop device. In some examples, the worst congestion state metrics identified by network interface device 300 can be forwarded in an egress packet to another network interface device. Resource consumption metrics can be conveyed in a header of a data packet that is to be transmitted to the next network interface device. Resource consumption metrics can be included in a header of an egress packet (e.g., Ethernet header) and the packet size may not grow as the packet traverses one or more nodes.

In some examples, resource consumption metrics can be conveyed in metadata of in-band telemetry schemes such as those described in: "In-band Network Telemetry (INT) Dataplane Specification, v2.0," P4.org Applications Working Group (February 2020); IETF draft-lapukhov-dataplane-probe-01, "Data-plane probe for in-band telemetry collection" (2016); and IETF draft-ietf-ippm-ioam-data-09, "In-situ Operations, Administration, and Maintenance (IOAM)" (Mar. 8, 2020). In-situ Operations, Administration, and Maintenance (IOAM) records operational and telemetry information in the packet while the packet traverses a path between two points in the network. IOAM discusses the data fields and associated data types for in-situ OAM. In-situ OAM data fields can be encapsulated into a variety of protocols such as NSH, Segment Routing, Geneve, IPv6 (via extension header), or IPv4.

In some examples, a worst or highest detected resource consumption as well as the next N worst or highest detected resource consumption can be conveyed in a packet, where N is an integer and N≥1.

Figure 4:
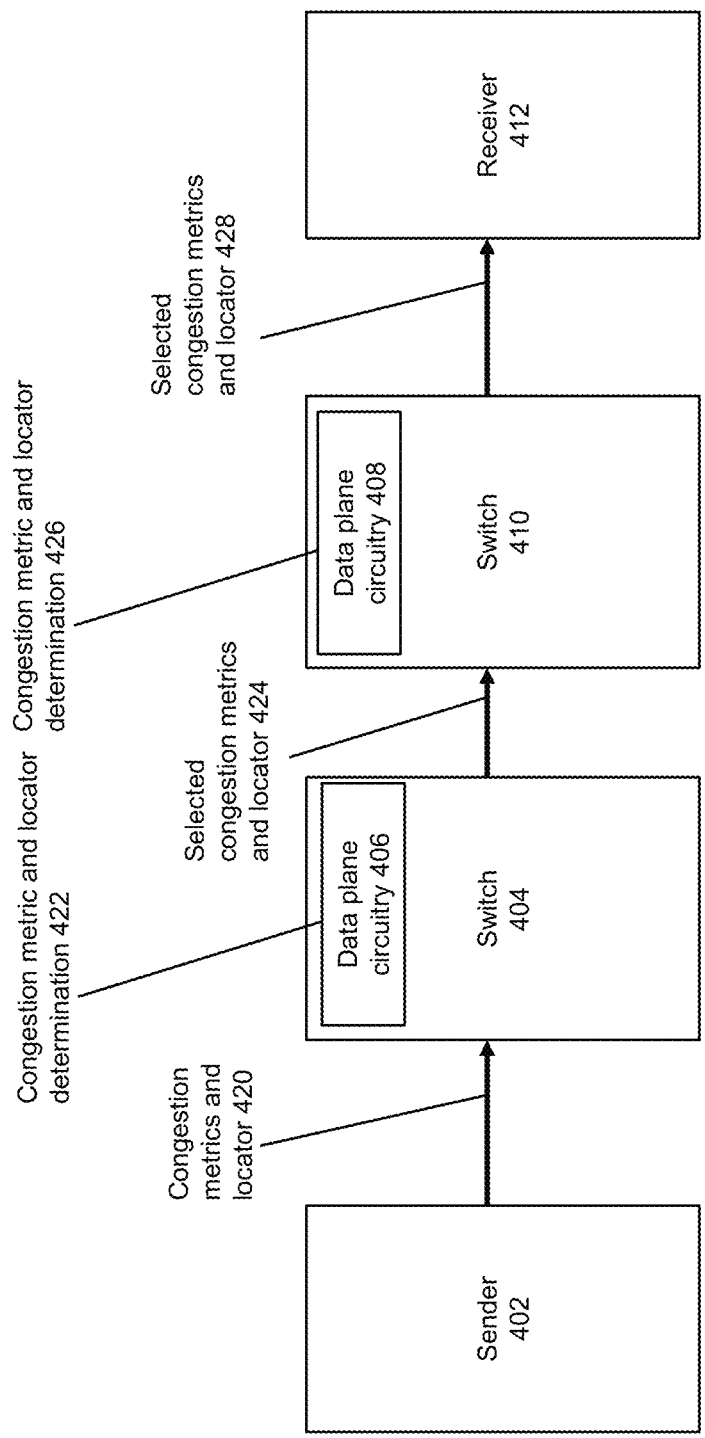
FIG. 4 depicts an example operation of network interface devices.

FIG. 4 depicts an example operation of network interface devices. Sender 402 can provide resource consumption metrics and locator information 420 in at least one packet (e.g., packet header and/or payload) to switch 404. Resource consumption metrics and locator information 420 can represent resource consumption metrics and location information of the measured congestion at sender 402 (e.g., queue, port). Switch 404 can utilize data plane circuitry 406 to determine whether the resource consumption metrics and location information received in the at least one packet are to be transferred or replaced with resource consumption metrics and location information measured at switch 404. In some examples, multiple resource consumption metrics and location information can be conveyed in a packet to identify locations corresponding to several resource consumption metrics near or at the worst or highest measured congestion. Data plane circuitry 406 can perform resource consumption metric and locator determination 422 to determine if resource consumption metrics and location information received in the at least one packet represent a worst congestion information in a path of nodes. In this example, resource consumption metrics and location information for switch 404 represent a worst congestion state in a path of nodes and data plane circuitry 406 can replace the resource consumption metrics and location information in the received at least one packet with the resource consumption metrics and location information for switch 404 and transmit the at least one packet with the replaced resource consumption metrics and location information (shown as selected resource consumption metrics and locator 424) to a next node in the path, switch 410. Switch 404 can be considered upstream from switch 410 and receiver 412.

Data plane circuitry 408 of switch 410 can perform resource consumption metric and locator determination 426 to determine if resource consumption metrics and location information received in the at least one packet represent a worst congestion information in a path of nodes. In this example, resource consumption metrics and location information for switch 410 do not represent a worst congestion state (or a worst and N or more next worst, next-to-next worst, and so forth) in a path of nodes and data plane circuitry 408 can maintain the resource consumption metrics and location information in the received at least one packet and transmit the at least one packet with maintained resource consumption metrics and location information (shown as selected resource consumption metrics and locator 428) to a next node in the path, receiver 412. Switch 410 can be considered upstream from receiver 412.

Based on received selected resource consumption metrics and locator 428, receiver 412 can perform calculations to determine a transmit rate of packets of a flow or queue by sender 402 or other action(s) to be taken by sender 402 and convey the determined transmit rate or other action(s) to sender 402 in feedback information 430. For example, receiver 412 can calculate the NewAck( ) and Compute-Wind( ) functions shown in FIG. 2 and convey the information to sender 402 in feedback information 430. Using feedback information 430 sent via one or more packets to sender 402, receiver 412 can inform sender 402 as to how to update a transmit rate or congestion window for a particular flow, or other information or actions. A congestion window can represent a number of packets or amount of data that can be transmitted before receipt of an acknowledgement of packet receipt.

By receiver 412 determining or indicating potential remedial actions to be taken by sender 402 for a particular flow or flows or queue(s), a number and/or size of packets sent to sender 402 by receiver 412 can be much lower than returning a packet with INT information, or probe packet.

Receiver 412 can send feedback information 430 in one or more packets to sender 402 when there is a significant change in the desired transmit rate (e.g., a change that is higher than a configured threshold) for a flow.

For packets of an identified flow or flows or queue(s) in received feedback information 430, sender 402 can respond by performing the requested actions from receiver 412 or determining an action (including no action). For example, for packets of an identified flow or flows in received feedback information 430, sender 402 can respond by performing a variety of actions including: no change of packet transmission rate, reduced transmission rate to a node identified as the most congested, selecting a different path that avoids a node identified as the most congested, change of congestion window size, and so forth. If congestion is identified to be at a level that is acceptable or not considered congested, receiver 412 may request that sender 402 perform no remedial action and continue or resume transmission of packets to or through a node identified as congested, but not congested to a level that the node is considered congested.

In some examples, one or more of switches 404 and 410 can perform summation of queuing latency (e.g., Google Bottleneck Bandwidth and Round-trip propagation time) and provide such information in a packet that is transmitted to receiver 412 and receiver 412 can perform delay modeling to determine a response to receipt of congestion information.

Figure 5:
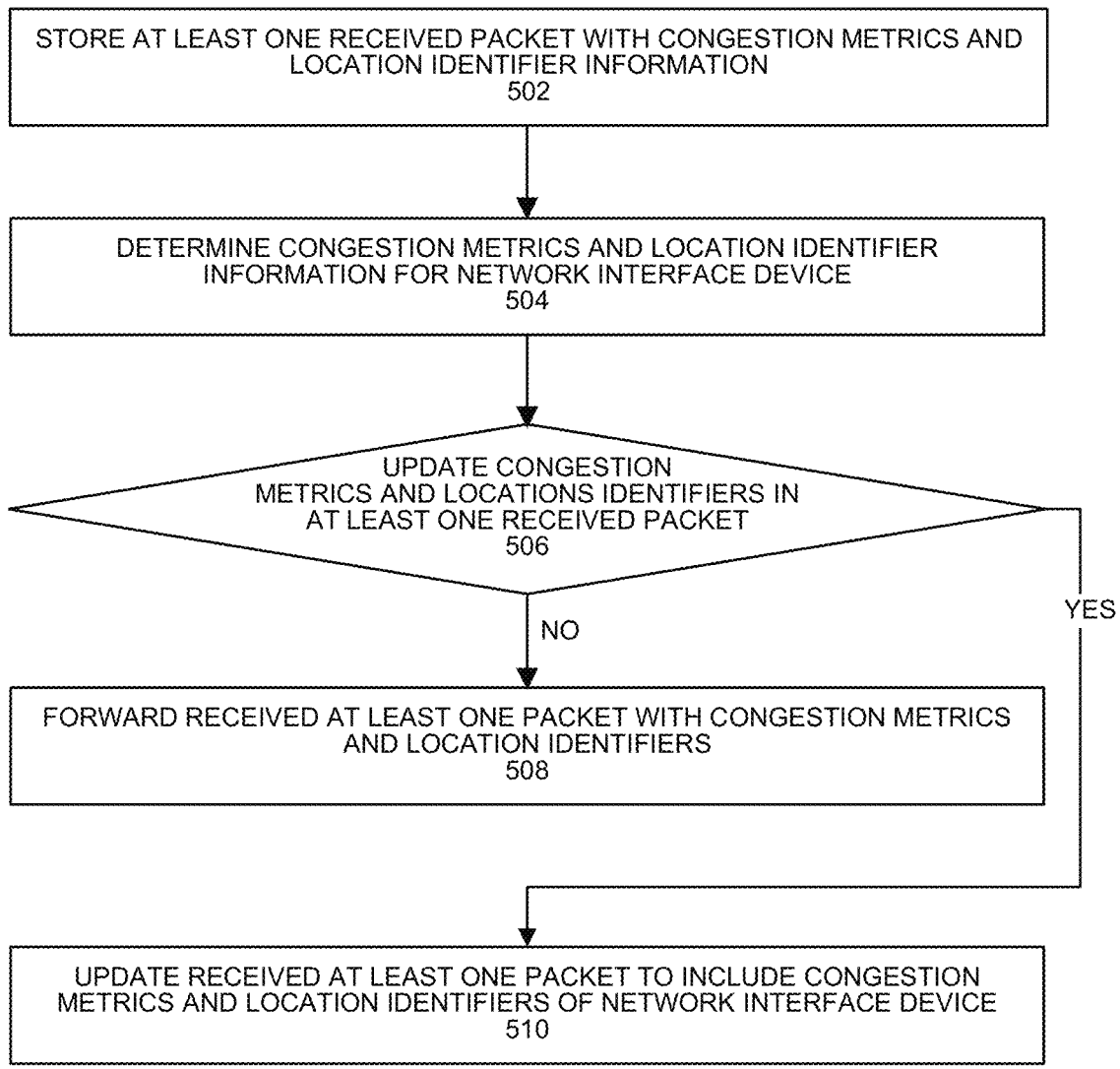
FIG. 5 depicts an example process.

FIG. 5 depicts an example process. The process can be performed by one or more intermediary network devices along a path from a sender network device to a receiver network device. At 502, the network interface device can store at least one received packet from another network interface device into a queue. At 504, the network interface device can determine a resource consumption metric and location identifier associated with the received at least one packet at the network interface device. For example, a resource consumption metric and location identifier can indicate one or more of: a value of inflight_bytes can be normalized by a normalization value (sFactor) to generate an integer number, available transmit bandwidth, transmit bandwidth used by a queue or flow, a queue depth (e.g., in terms of stored bytes) and queue identifier that stored the received at least one packet, time of the received at least one packet within a queue and queue identifier that stored the received at least one packet, measured queueing time duration of the received at least one packet, expected queueing time duration of the received at least one packet, packet latency of the received at least one packet, or others listed herein. Generation of resource consumption metric and associated location identifier subjected to the received at least one packet at the network interface device can be performed by a fixed-function or programmable data plane circuit.

At 506, the network interface device can determine whether to replace the resource consumption metric and location identifier in the received at least one packet with resource consumption metric and location identifier associated with the network interface device. For example, the network interface device can convey a resource consumption metric information and associated location identifier for a highest level of congestion and/or lowest transmit rate. In some examples, the N highest congestion and/or transmit rates are identified, where N≥1.

At 506, in some examples, the network interface device can determine to retain the resource consumption metric and location identifier in the received at least one packet with resource consumption metric and location identifier associated with the network interface device if the resource consumption metric associated with the network interface device represents a same or lower level of congestion and/or same or higher transmit rate than that of the resource consumption metric in the received at least one packet. In cases multiple metrics are utilized to form an aggregate congestion metric, such as using a weighted combination of metrics. The congestion metric is conveyed or the N highest aggregate congestion metrics are conveyed. The process can continue to 508.

At 506, in some examples, the network interface device can determine to replace the resource consumption metric and location identifier in the received at least one packet with resource consumption metric and location identifier associated with the network interface device if the resource consumption metric associated with the network interface device represents a higher level of congestion and/or lower transmit rate than that of the resource consumption metric in the received at least one packet. In cases multiple metrics are utilized to form an aggregate congestion metric, such as using a weighted combination of metrics. A highest aggregate congestion metric is conveyed or the N highest aggregate congestion metrics are conveyed. The process can continue to 510.

At 508, the network interface device can retain the resource consumption metric and location identifier in the received at least one packet and transmit the at least one packet with retained resource consumption metric(s) and location identifier(s).

At 510, the network interface device can replace the resource consumption metric and location identifier in the received at least one packet with resource consumption metric and location identifier associated with the network interface device and transmit the at least one packet with replaced resource consumption metric(s) and location identifier(s) to a next node towards a sender. As described herein, the sender can take remedial actions or no action based on the received resource consumption metric(s) and location identifier(s).

Figure 6:
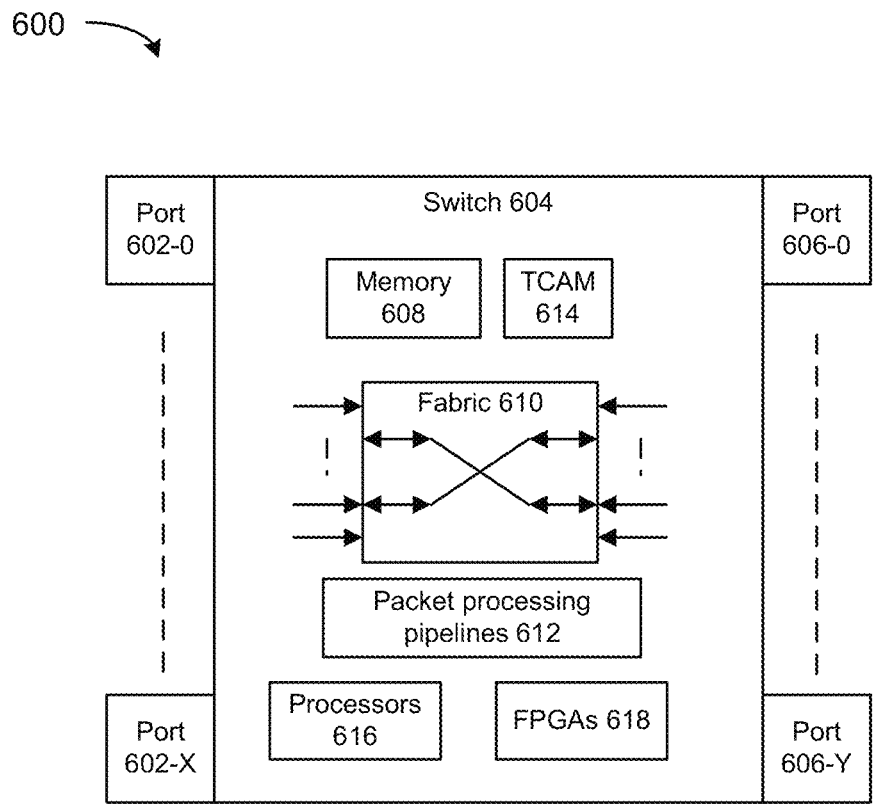
FIG. 6 depicts an example switch.

FIG. 6 depicts an example switch. Various embodiments can be used in or with the switch to determine resource consumption metrics for switch 600 and propagate in at least one packet, packet resource consumption metrics and resource identifiers concerning switch 600 or another network interface device depending on which resource consumption metrics represent worse congestion, as described herein. Switch 604 can route packets or frames of any format or in accordance with any specification from any port 602-0 to 602-X to any of ports 606-0 to 606-Y (or vice versa). Any of ports 602-0 to 602-X can be connected to a network of one or more interconnected devices. Similarly, any of ports 606-0 to 606-Y can be connected to a network of one or more interconnected devices.

In some examples, switch fabric 610 can provide routing of packets from one or more ingress ports for processing prior to egress from switch 604. Switch fabric 60 can be implemented as one or more multi-hop topologies, where example topologies include torus, butterflies, buffered multi-stage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 608 can be configured to store packets received at ports prior to egress from one or more ports. Packet processing pipelines 612 can determine which port to transfer packets or frames to using a table that maps packet characteristics with an associated output port. Packet processing pipelines 612 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 612 can implement access control list (ACL) or packet drops due to queue overflow. Packet processing pipelines 612 can be configured to determine resource consumption metrics for switch 600 and propagate in at least one packet, packet resource consumption metrics and resource identifiers concerning switch 600 or another network interface device depending on which resource consumption metrics represent worse congestion or N worst congestion levels, as described herein. Congestion levels can be expressed as an aggregate metric or separate metrics for different measured metrics.

Configuration of operation of packet processing pipelines 612, including its data plane, can be programmed using P4, C, Python, Broadcom Network Programming Language (NPL), or x86 compatible executable binaries or other executable binaries. Processors 616 and FPGAs 618 can be utilized for packet processing or modification.

Figure 7:
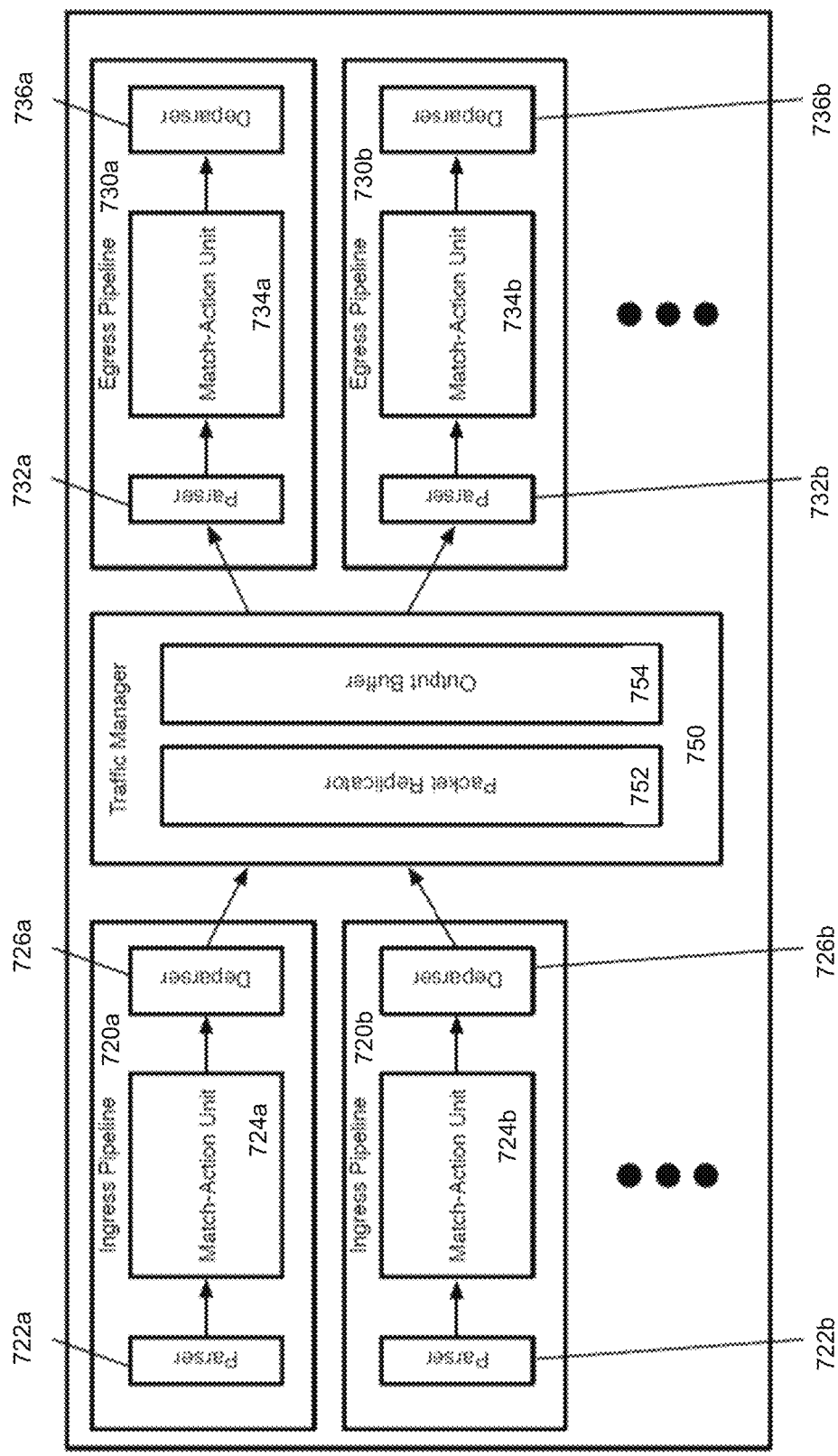
FIG. 7 depicts an example switch.

FIG. 7 depicts an example network forwarding system that can be used as a switch or router. For example, FIG. 7 illustrates several ingress pipelines 720, a traffic management unit (referred to as a traffic manager) 750, and several egress pipelines 730. Though shown as separate structures, in some embodiments the ingress pipelines 720 and the egress pipelines 730 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, the packet is directed to one of the ingress pipelines 720 where an ingress pipeline which may correspond to one or more ports of a hardware forwarding element. After passing through the selected ingress pipeline 720, the packet is sent to the traffic manager 750, where the packet is enqueued and placed in the output buffer 754. In some embodiments, the ingress pipeline 720 that processes the packet specifies into which queue the packet is to be placed by the traffic manager 750 (e.g., based on the destination of the packet or a flow identifier of the packet). The traffic manager 750 then dispatches the packet to the appropriate egress pipeline 730 where an egress pipeline may correspond to one or more ports of the forwarding element. In some embodiments, there is no necessary correlation between which of the ingress pipelines 720 processes a packet and to which of the egress pipelines 730 the traffic manager 750 dispatches the packet. That is, a packet might be initially processed by ingress pipeline 720*b* after receipt through a first port, and then subsequently by egress pipeline 730*a* to be sent out a second port, etc.

A least one ingress pipeline 720 includes a parser 722, a chain of multiple match-action units (MAUs) 724, and a deparser 726. Similarly, egress pipeline 730 can include a parser 732, a chain of MAUs 734, and a deparser 736. The parser 722 or 732, in some embodiments, receives a packet as a formatted collection of bits in a particular order, and parses the packet into its constituent header fields. In some examples, the parser starts from the beginning of the packet and assigns header fields to fields (e.g., data containers) for processing. In some embodiments, the parser 722 or 732 separates out the packet headers (up to a designated point) from the payload of the packet, and sends the payload (or the entire packet, including the headers and payload) directly to the deparser without passing through the MAU processing. Egress parser 732 can use additional metadata provided by the ingress pipeline to simplify its processing.

The MAUs 724 or 734 can perform processing on the packet data. In some embodiments, the MAUs includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using MAU(s), resource consumption metrics at the switch or router can be determined and propagated in at least one packet, packet resource consumption metrics and resource identifiers concerning switch or router or another network interface device depending on which resource consumption metrics represent worse congestion, as described herein.

The deparser 726 or 736 can reconstruct the packet using the PHV as modified by the MAU 724 or 734 and the payload received directly from the parser 722 or 732. The deparser can construct a packet that can be sent out over the physical network, or to the traffic manager 750. In some embodiments, the deparser can construct this packet based on data received along with the PHV that specifies the protocols to include in the packet header, as well as its own stored list of data container locations for each possible protocol's header fields.

Traffic manager 750 can include a packet replicator 752 and output buffer 754. In some embodiments, the traffic manager 750 may include other components, such as a feedback generator for sending signals regarding output port failures, a series of queues and schedulers for these queues, queue state analysis components, as well as additional components. Packet replicator 752 of some embodiments performs replication for broadcast/multicast packets, generating multiple packets to be added to the output buffer (e.g., to be distributed to different egress pipelines).

The output buffer 754 can be part of a queuing and buffering system of the traffic manager in some embodiments. The traffic manager 750 can provide a shared buffer that accommodates any queuing delays in the egress pipelines. In some embodiments, this shared output buffer 754 can store packet data, while references (e.g., pointers) to that packet data are kept in different queues for each egress pipeline 730. The egress pipelines can request their respective data from the common data buffer using a queuing policy that is control-plane configurable. When a packet data reference reaches the head of its queue and is scheduled for dequeuing, the corresponding packet data can be read out of the output buffer 754 and into the corresponding egress pipeline 730. In some embodiments, packet data may be referenced by multiple pipelines (e.g., for a multicast packet). In this case, the packet data is not removed from this output buffer 754 until all references to the packet data have cleared their respective queues.

In some examples, a memory or queue that stores packets is different from the memory that tracks the per-queue resource consumption metrics. Packet buffers or queues can be part of a traffic manager (TM) 750 and resource consumption metrics can be computed and tracked in match-action pipes, at ingress or egress pipelines. TM 750 can provide the queue depth or queueing time information part of per-packet metadata so that the egress or ingress pipeline can use that information to calculate the overall metrics and make the compare and update decision on the metrics carried in the packet header.

Figure 8:
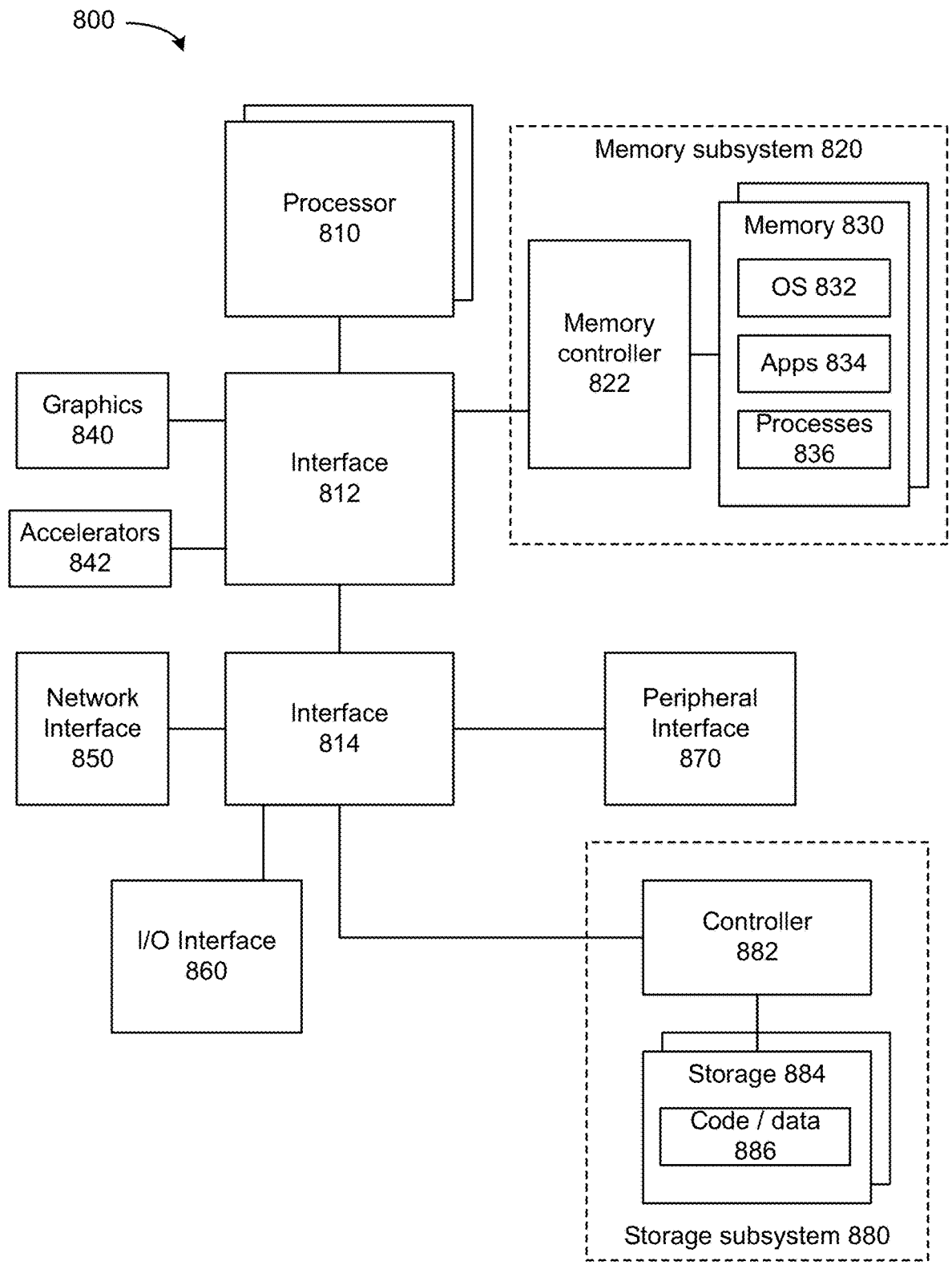
FIG. 8 depicts an example system.

FIG. 8 depicts an example computing system. System 800 can be used to program network interface device 850 to determine resource consumption metrics at network interface device 850 and propagate resource consumption metrics and resource identifiers concerning network interface device 850 or another network interface device depending on which resource consumption metrics represent worse congestion, as described herein. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can advertise capability of network interface device 850 to determine resource consumption metrics and propagate resource consumption metrics and resource identifiers concerning network interface device 850 or another network interface device depending on which resource consumption metrics represent worse congestion, as described herein. Other examples of driver operation include configuring network interface device 850 to determine resource consumption metrics and propagate resource consumption metrics and resource identifiers concerning network interface device 850 or another network interface device depending on which resource consumption metrics represent worse congestion, as described herein.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include stand-alone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising dataplane circuitry that, when operational, is to generate a representation of aggregated network resource consumption information based on network resource consumption at the network interface device or at least one other network device and to transmit at least one packet with a multi-bit representation of the aggregated network resource consumption information to a second network interface device.

Example 2 includes one or more examples, wherein the representation of the aggregated network resource consumption information is to provide network resource consumption information in a bit size bounded manner.

Example 3 includes one or more examples, wherein the network resource consumption information comprises one or more of: available transmit bandwidth, transmit bandwidth used by a queue or flow, queue depth, measured queueing time duration, expected queueing time duration, packet latency, or normalized in-flight bytes.

Example 4 includes one or more examples, wherein the representation of the aggregated network resource consumption information is to identify a network resource associated with network resource consumption information.

Example 5 includes one or more examples, wherein the representation of the aggregated network resource consumption information comprises an indication of a worst network resource consumption information associated with a forwarding element upstream from the network interface device.

Example 6 includes one or more examples, wherein the dataplane circuitry that, when operational, is to convert a decimal value measure of normalized in-flight bytes to integer form and provide the integer form measure of normalized in-flight bytes in the transmitted at least one packet.

Example 7 includes one or more examples, wherein the dataplane circuitry, when operational, is to determine resource consumption information at the network interface device and resource consumption information from a received packet representative of congestion at an upstream node from the network interface device and (a) based on the resource consumption information at the network interface device representing higher congestion than that of the resource consumption information from a received packet representative of congestion at an upstream node from the network interface device, replace resource consumption information from a received packet representative of congestion at an upstream node from the network interface device with resource consumption information at the network interface device or (b) based on the resource consumption information at the network interface device representing a same or lower congestion than that of the resource consumption information from a received packet representative of congestion at an upstream node from the network interface device, retain resource consumption information in a received packet representative of congestion at an upstream node from the network interface device and the transmitted at least one packet with a multi-bit representation of the aggregated network resource consumption information comprises the received packet with the replaced or retained resource consumption information.

Example 8 includes one or more examples, wherein the network interface device is to operate consistent with High Precision Congestion Control (HPCC).

Example 9 includes one or more examples, comprising a server communicatively coupled to the network interface device, wherein the server is to configure the network interface device to generate a representation of aggregated network resource consumption information based on network resource consumption information at the network interface device or at least one other network device and to transmit the at least one packet with a multi-bit representation of the aggregated network resource consumption information.

Example 10 includes one or more examples, comprising a datacenter that comprises the server, wherein the datacenter comprises the network interface device and the second network interface device, the network interface device is to perform a per-flow or per-queue computation of multi-bit representation of the aggregated network resource consumption information and transmit at least one packet with the multi-bit representation of the aggregated network resource consumption information to the second network interface device, the second network interface device is to receive the transmitted at least one packet with a multi-bit representation of the aggregated network resource consumption information, and the second network interface device is to selectively modify transmit rate of packets, per-flow or per-queue, based on the multi-bit representation of the aggregated network resource consumption information.

Example 11 includes one or more examples, and includes at least one computer-readable medium, comprising instructions stored thereon, that if executed by at least one processor, cause the at least one processor to: configure a network interface device to generate a representation of aggregated network resource consumption information based on network resource consumption at the network interface device or at least one other network device and to transmit at least one packet with a multi-bit representation of the aggregated network resource consumption information to a second network interface device.

Example 12 includes one or more examples, wherein the representation of the aggregated network resource consumption information is to provide network resource consumption information in a bit size bounded manner.

Example 13 includes one or more examples, wherein the network resource consumption information comprises one or more of: available transmit bandwidth, transmit bandwidth used by a queue or flow, queue depth, measured queueing time duration, expected queueing time duration, packet latency, or normalized in-flight bytes.

Example 14 includes one or more examples, wherein the representation of the aggregated network resource consumption information is to identify a network resource associated with network resource consumption information.

Example 15 includes one or more examples, wherein the representation of the aggregated network resource consumption information comprises an indication of a worst network resource consumption information associated with a switch upstream from the network interface device.

Example 16 includes one or more examples, wherein the network interface device is to convert a decimal value measure of normalized in-flight bytes to integer form and provide the integer form measure of normalized in-flight bytes in the transmitted at least one packet.

Example 17 includes one or more examples, and includes a method comprising: at a network interface device: generating a representation of aggregated network resource consumption information based on higher of network resource consumption at the network interface device or at least one other network device and transmitting at least one packet with a multi-bit representation of the aggregated network resource consumption information to a second network interface device.

Example 18 includes one or more examples, wherein the network resource consumption information comprises one or more of: available transmit bandwidth, transmit bandwidth used by a queue or flow, queue depth, measured queueing time duration, expected queueing time duration, packet latency, or normalized in-flight bytes.

Example 19 includes one or more examples, wherein the representation of the aggregated network resource consumption information is to identify a network resource associated with network resource consumption information.

Example 20 includes one or more examples, wherein the representation of the aggregated network resource consumption information comprises an indication of a worst network resource consumption information associated with a node upstream from the network interface device.

What is claimed is:

1. An apparatus comprising:
a network interface device comprising dataplane circuitry that, when operational, is to
generate a representation of aggregated network resource consumption information based on network resource consumption at the network interface device and network resource consumption of at least one other network device, wherein the network interface device is to receive the network resource consumption of the at least one other network device in at least one received packet and
transmit at least one packet with a multi-bit representation of the aggregated network resource consumption information to a second network interface device,
wherein the multi-bit representation of the aggregated network resource consumption information comprises a single value representative of network resource consumption information of multiple network interface device hops and
wherein:
the dataplane circuitry, when operational, is to determine resource consumption information at the network interface device and resource consumption information from the at least one received packet representative of congestion at an upstream node from the network interface device and (a) based on the resource consumption information at the network interface device representing higher congestion than that of the resource consumption information from the at least one received packet representative of congestion at the upstream node from the network interface device, replace resource consumption information from the at least one received packet representative of congestion at the upstream node from the network interface device with resource consumption information of the network interface device and (b) based on the resource consumption information at the network interface device representing a lower congestion than that of the resource consumption information from the at least one received packet representative of congestion at the upstream node from the network interface device, retain resource consumption information in the at least one received packet representative of congestion at the upstream node from the network interface device and
the transmitted at least one packet with a multi-bit representation of the aggregated network resource consumption information comprises the at least one received packet with the replaced or retained resource consumption information.

2. The apparatus of claim 1, wherein the multi-bit representation of the aggregated network resource consumption information is to provide network resource consumption information in a bit size bounded manner so that the aggregated network resource consumption information is a fixed size irrespective of a number of the multiple network interface device hops.

3. The apparatus of claim 1, wherein the network resource consumption information comprises one or more of: available transmit bandwidth, transmit bandwidth used by a queue or flow, queue depth, measured queueing time duration, expected queueing time duration, packet latency, or normalized in-flight bytes.

4. The apparatus of claim 1, wherein the multi-bit representation of the aggregated network resource consumption information comprises an indication of a worst network resource consumption information associated with a forwarding element upstream from the network interface device.

5. The apparatus of claim 1, wherein the dataplane circuitry that, when operational, is to convert a decimal value measure of normalized in-flight bytes to integer form and provide the integer form measure of normalized in-flight bytes as the multi-bit representation of the aggregated network resource consumption information in the transmitted at least one packet.

6. The apparatus of claim 1, wherein the network interface device is to operate consistent with High Precision Congestion Control (HPCC).

7. The apparatus of claim 1, comprising a server communicatively coupled to the network interface device, wherein the server is to configure the network interface device to generate a representation of aggregated network resource consumption information based on network resource consumption information at the network interface device or at least one other network device and to transmit the at least one packet with the multi-bit representation of the aggregated network resource consumption information.

8. The apparatus of claim 7, comprising a datacenter that comprises the server, wherein
the datacenter comprises the network interface device and the second network interface device,
the network interface device is to perform a per-flow or per-queue computation of multi-bit representation of the aggregated network resource consumption information and transmit the at least one packet with the multi-bit representation of the aggregated network resource consumption information to the second network interface device,
the second network interface device is to receive the transmitted at least one packet with the multi-bit representation of the aggregated network resource consumption information, and
the second network interface device is to selectively modify transmit rate of packets, per-flow or per-queue, based on the multi-bit representation of the aggregated network resource consumption information.

9. At least one non-transitory computer-readable medium, comprising instructions stored thereon, that if executed by at least one processor, cause the at least one processor to:
configure a network interface device to:
generate a representation of aggregated network resource consumption information based on network resource consumption at the network interface device and network resource consumption of at least one other network device, wherein the network interface device is to receive the network resource consumption of the at least one other network device in at least one received packet and wherein the network interface device is to determine resource consumption information at the network interface device and resource consumption information from the at least one received packet representative of congestion at an upstream node from the network interface device and (a) based on the resource consumption information at the network interface device representing higher congestion than that of the resource consumption information from the at least one received packet representative of congestion at the upstream node from the network interface device, replace resource consumption information from the at least one received packet representative of congestion at the upstream node from the network interface device with resource consumption information of the network interface device and (b) based on the resource consumption information at the network interface device representing a lower congestion than that of the resource consumption information from the at least one received packet representative of congestion at the upstream node from the network interface device, retain resource consumption information in the at least one received packet representative of congestion at the upstream node from the network interface device and transmit at least one packet with a multi-bit representation of the aggregated network resource consumption information to a second network interface device, wherein the multi-bit representation of the aggregated network resource consumption information comprises a single value representative of network resource consumption information of multiple network interface device hops and the transmitted at least one packet with a multi-bit representation of the aggregated network resource consumption information comprises the at least one received packet with the replaced or retained resource consumption information.

10. The at least one computer-readable medium of claim 9, wherein the multi-bit representation of the aggregated network resource consumption information is to provide the network resource consumption information of multiple network interface device hops in a bit size bounded manner.

11. The at least one computer-readable medium of claim 9, wherein the network resource consumption information comprises one or more of: available transmit bandwidth, transmit bandwidth used by a queue or flow, queue depth, measured queueing time duration, expected queueing time duration, packet latency, or normalized in-flight bytes.

12. The at least one computer-readable medium of claim 9, wherein the multi-bit representation of the aggregated network resource consumption information is to identify a network resource associated with the network resource consumption information of multiple network interface device hops.

13. The at least one computer-readable medium of claim 9, wherein the multi-bit representation of the aggregated network resource consumption information comprises an indication of a worst network resource consumption information associated with a switch upstream from the network interface device.

14. The at least one computer-readable medium of claim 9, wherein the network interface device is to convert a decimal value measure of normalized in-flight bytes to integer form and provide the integer form measure of normalized in-flight bytes as the multi-bit representation of the aggregated network resource consumption information in the transmitted at least one packet.

15. A method comprising:
at a network interface device:
generating a representation of aggregated network resource consumption information based on higher of network resource consumption at the network interface device and network resource consumption of at least one other network device, wherein the network interface device is to receive the network resource consumption of the at least one other network device in at least one received packet and (a) based on the resource consumption information at the network interface device representing higher congestion than that of the resource consumption information from the at least one received packet representative of congestion at an upstream node from the network interface device, replace resource consumption information from the at least one received packet representative of congestion at the upstream node from the network interface device with resource consumption information of the network interface device and (b) based on the resource consumption information at the network interface device representing a lower congestion than that of the resource consumption information from the at least one received packet representative of congestion at the upstream node from the network interface device, retain resource consumption information in the at least one received packet representative of congestion at the upstream node from the network interface device and transmitting at least one packet with a multi-bit representation of the aggregated network resource consumption information to a second network interface device, wherein
the multi-bit representation of the aggregated network resource consumption information comprises a single value representative of network resource consumption information of multiple network interface device hops and the transmitted at least one packet with a multi-bit representation of the aggregated network resource consumption information comprises the at least one received packet with the replaced or retained resource consumption information.

16. The method of claim 15, wherein the network resource consumption information comprises one or more of: available transmit bandwidth, transmit bandwidth used by a queue or flow, queue depth, measured queueing time duration, expected queueing time duration, packet latency, or normalized in-flight bytes.

17. The method of claim 15, wherein the multi-bit representation of the aggregated network resource consumption information comprises an indication of a worst network resource consumption information associated with a node upstream from the network interface device.

18. The method of claim 15, wherein the multi-bit representation of the aggregated network resource consumption information is to provide the network resource consumption information of multiple network interface device hops in a bit size bounded manner to limit a number of bits that convey network resource consumption of the multiple network interface device hops irrespective of a quantity of the multiple network interface device hops.

19. The apparatus of claim 1, wherein to generate a representation of aggregated network resource consumption information, the dataplane circuitry is to perform match-action operations.

* * * * *